UNITED STATES PATENT OFFICE.

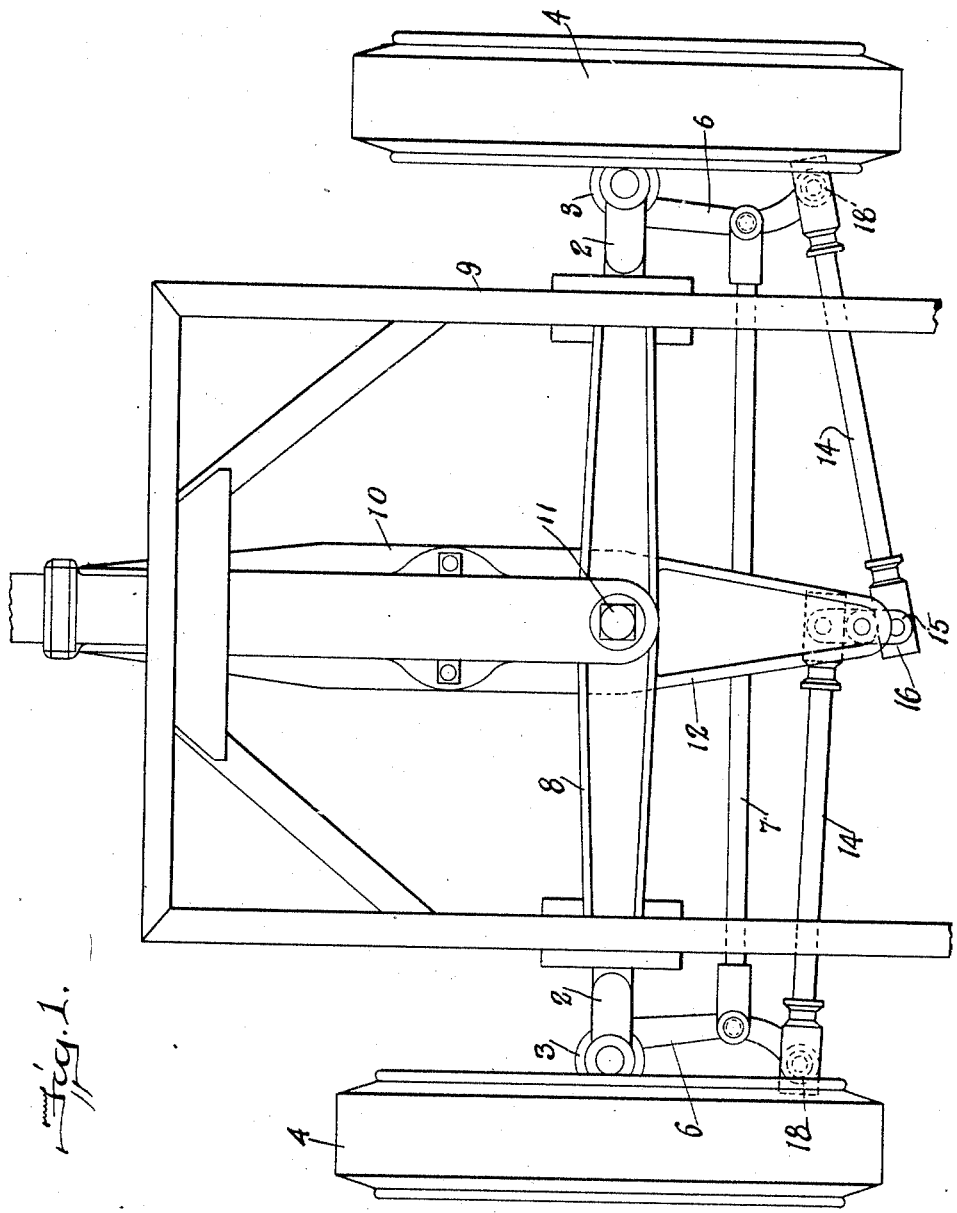

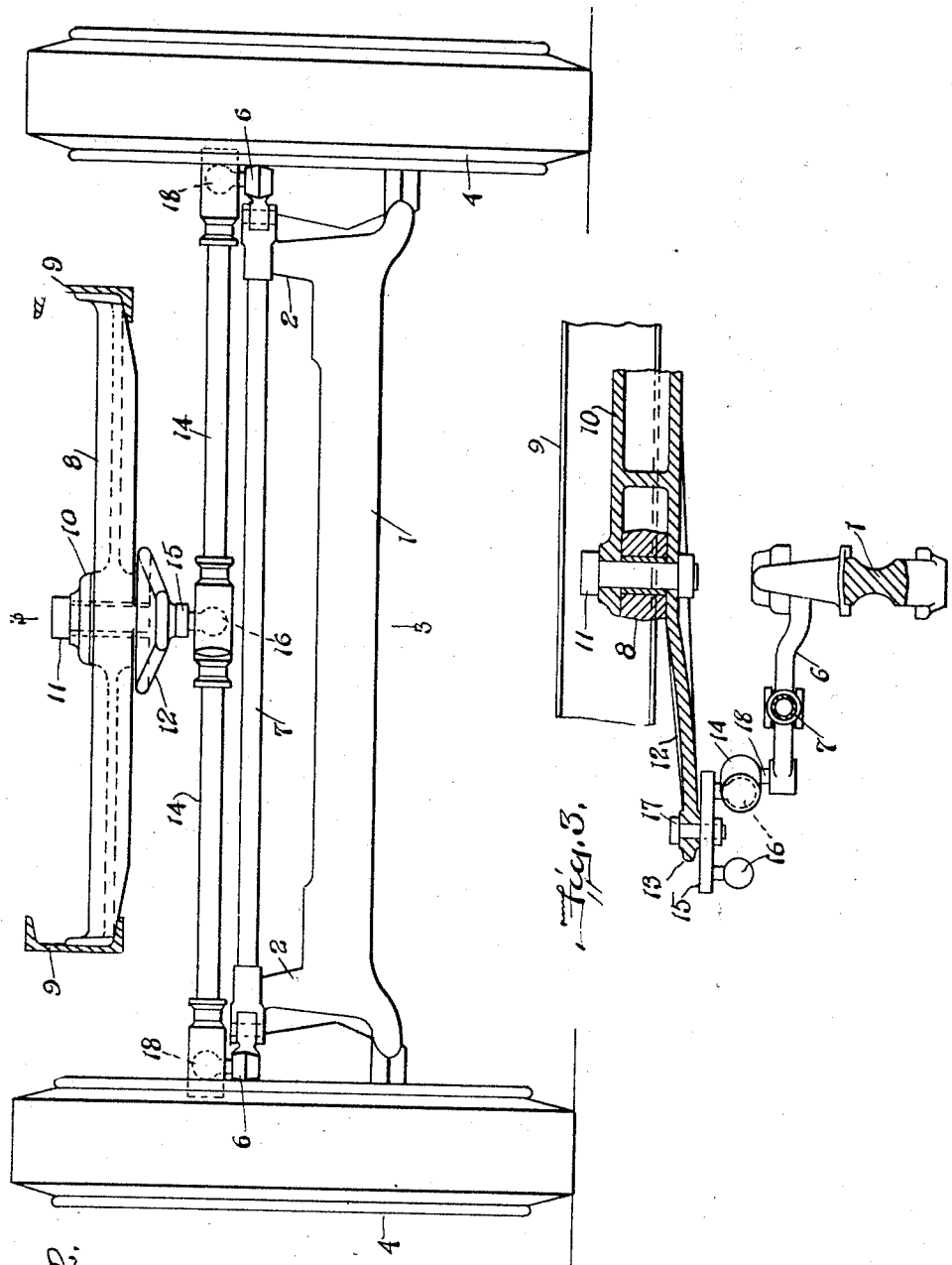

TRACY E. GEIGER, OF TROY, OHIO.

STEERING DEVICE FOR VEHICLES.

1,366,123.　　　Specification of Letters Patent.　　Patented Jan. 18, 1921.

Application filed August 27, 1919. Serial No. 320,170.

*To all whom it may concern:*

Be it known that I, TRACY E. GEIGER, a citizen of the United States, residing at Troy, in the county of Miami and State of Ohio, have invented certain new and useful Improvements in Steering Devices for Vehicles, of which the following is a specification, reference being had therein to the accompanying drawing.

This invention relates to steering devices for vehicles and has for its particular object to provide improved steering mechanism for trailer vehicles, the invention in its present form being especially applicable to trailers attached to leading automobiles.

In trailers of this character the steering conditions are different from those applying to the steering of an automobile inasmuch as the steering must be done through connections to the leading truck and not direct or independently as in the case of an automobile.

A great difficulty found in the steering of trailers arises from the effect produced upon the steering wheels by the up and down movements and unequal side sway of the trailer frame or body which may be produced by various causes, such as traveling over an uneven road, or unequal distribution of the load carried by the trailer.

It has been common practice to use mechanism for steering trailers of the type ordinarily used for steering automobiles, comprising mounting of the steering wheels on journals pivoted to a fixed axle, steering arms secured to the journals and connected by a common tie bar, ordinary drag links being usually connected to the ends of the tie bar. With this type of steering apparatus applied it has been found in practice in the operation of trailers that the constantly variable movements of the trailer frame relative to the steering mechanism and steering wheels, acts to deflect the wheels, inwardly or outwardly, according as the movement of the frame may be up and down. Thus to the extent of deflection in either direction the wheels are forced out of alinement with each other and with the general line of travel.

This is obviously a bad condition and, to correct the defect has been a problem, the solution of which has been sought by manufacturers and users of automobile trailers ever since they have come into common use, but no complete solution of the problem has heretofore been found.

A marked improvement in trailer steering mechanisms of this character is disclosed in Patent No. 1,262,771, issued to me April 16, 1918, and assigned to the assignees of the present invention. A further improvement in the same general type of steering mechanism comprised in the invention of the above patent forms the subject matter of the present invention.

The improvement and present invention consist in pivoting the steering draw bar to the trailer frame substantially above and as here shown in vertical alinement with the fixed axle of the front truck; in extending the draw bar rearwardly of its pivotal connection to the frame to a point substantially beyond the ends of the rearwardly extending steering arms of the wheel journals, the drag links being disposed between the steering arms and the rearward end of the draw bar and inclined upwardly and outwardly at their inner ends and connected to the end of the draw bar by a compensating link, the steering tie bar being connected to the steering arms intermediate their ends and the wheel journals.

By this arrangement the steering wheels are held substantially in exact alinement with each other by the tie bar and the end thrust of the drag links and deflection of the wheels caused by the up and down movement and side sway of the frame is materially reduced by the equalization of the arc through which the inner ends of the drag links are moved.

With the foregoing statement of the objects and functional operations of my invention the mechanical construction and operation thereof will be readily understood from the drawings and the following detailed description of the construction shown therein.

Figure 1 is a plan view of the front truck and a portion of the frame of a trailer to which the present invention has been applied;

Fig. 2 is a rear elevation of the construction shown in Fig. 1; and

Fig. 3 is a detail vertical sectional view taken on the line 3—3 of Fig. 2.

As here shown, the front truck consists of the usual fixed axle 1, having yokes 2 formed in its outer ends in which the vertical wheel journals 3 are supported. Wheels 4 are supported on horizontal spindles in the usual manner and have the required movement about the journals 3 to permit of the steering movements thereof. Rigidly secured to the journals 3 are rearwardly extending steering arms 6 joined together intermediate their ends and the journals 3 by a tie bar 7 which serves to hold the wheels in substantially exact alinement with each other but free to move relatively to the axle 1 and the general direction of travel in the turning or steering operations thereof.

It will be seen that but for the presence and coördination of the tie rod 7 with the compensating link and steering rods, the wheels would be uncontrollable because of the freedom of the compensating link to turn on its pivot without any movement of the draw bar. Therefore, without the tie rod 7 the result obtained by the distance between the draw bar pivot and the connection of the steering links with the draw bar, as compared with the distance from the wheel swivel to the point on the steering arms where the steering rods are connected with it, would not be possible. But this coördination of the several parts gives the improved result sought.

A detail of the trailer frame is shown at 8 and 9. The draw bar 10 is shown pivoted to the cross frame 8 by means of a king bolt 11, the forward end of the draw bar (not shown) being provided with any suitable means to connect the same to a leading vehicle. The rear end 12 of the draw bar extends rearwardly to a point substantially beyond a center line drawn through the end bearings of the steering arms 6.

The drag links 14 are disposed at an upward and outward angle between the draw bar and the steering arms 6, and connected to the draw bar by means of a compensating link 15 which, as here shown, is connected to the drag links by ball and socket joints 16 and to the draw bar by a pivot bolt 17; the drag links being connected to the steering arms by ball and socket joints 18. The ball and socket joints 16 and 18 serve to further compensate for the variable up and down movements of the draw bar and thus to further minimize the deflection of the steering wheels.

From the foregoing detailed description the construction and operation of the improved steering mechanism will be readily understood. While the construction here shown is a preferred form in which the objects of my invention may be realized, it will be understood that substantial departures may be made from the details of construction without departing from the underlying principle and the spirit of the invention.

The invention consists essentially in the construction and arrangement of a trailer steering mechanism wherein the deflection of the steering wheels is materially reduced over other steering mechanism commonly used by so relating the draw bar to the steering arms that the relative movements of the draw bar caused by the up and down and side sway of the frame will be neutralized or compensated for by the drag links or other suitable mechanism interposed therebetween.

The use of automobile trailers is being rapidly extended for various purposes including the carrying of passengers. It is, therefore, essential commercially that a construction and operation of steering apparatus be provided whereby swaying of the vehicles, especially when used for carrying passengers, will be minimized to insure both the comfort and safety of the passengers. These objects have been sought and realized in the present invention.

Having thus fully described my invention, what I claim as new and desire to secure by Letters Patent, is:—

1. In a trailer, the combination, with a body to carry the load, and a draw bar pivoted thereto, of an axle, ground wheels swiveled to the axle and having steering arms, a rod connecting said arms together, and steering rods connected to each steering arm and both to the draw bar, the point of connection of said rods to the draw bar being farther from the draw bar pivot than the point of connection of said rods to the arms is from the center of the wheel swivels.

2. In a trailer, the combination, with a main frame for carrying the load, and a draw bar pivoted thereto and having a rearward extension projecting beyond the pivot, of a supporting axle for the frame, wheels swiveled to said axle and having steering arms, a tie rod connecting said arms together at a point intermediate their ends, and steering rods connected one to each steering arm and both to said rearward extension of the draw bar, the point of connection of the steering rods with the draw bar extension being farther from the draw bar pivot than is the point of connection of the connecting links with the steering arms from the center of the wheel pivots, for the purpose described.

3. In a trailer, the combination, with a frame for carrying the load, and a draw bar pivoted thereto and having an extension rearward of its pivot, of an axle for supporting the frame, wheels swiveled thereto and having steering arms, a rod connecting said arms together at points intermediate their ends, a compensating link pivoted to the draw bar extension and spring rods connected to said link and to the steering arms, the radius from the draw bar pivot to the link pivoted to the draw bar extension being greater than the radius from the wheel pivots to the connection of the steering arms with the steering rods, for the purpose described.

4. In a trailer the combination with a frame to carry the load, a draw bar pivoted to the frame and having a rearward extension inclined downward, of an axle, wheels swiveled thereto, the axle being substantially under the draw bar pivot, steering arms to control the wheels extending rearward and somewhat upward, a compensating link pivoted at the lower side of the rear extension of the draw bar, steering rods pivoted to the steering arms and inclining rearward and pivoted to the compensating link, such steering rods being in the plane between the steering arms and the compensating link, and a tie rod interconnecting the steering arms, all for the purpose set forth.

In testimony whereof I affix my signature.

TRACY E. GEIGER.